(12) United States Patent
Kato

(10) Patent No.: US 11,556,602 B2
(45) Date of Patent: Jan. 17, 2023

(54) SEARCH DEVICE, SEARCH APPLICATION, AND SEARCH METHOD

(71) Applicant: Tsubasa Kato, Hiratsuka (JP)

(72) Inventor: Tsubasa Kato, Hiratsuka (JP)

( * ) Notice: Subject to any disclaimer, the term of this patent is extended or adjusted under 35 U.S.C. 154(b) by 0 days.

(21) Appl. No.: 17/630,619

(22) PCT Filed: Dec. 11, 2020

(86) PCT No.: PCT/JP2020/046312
§ 371 (c)(1),
(2) Date: Jan. 27, 2022

(87) PCT Pub. No.: WO2021/117876
PCT Pub. Date: Jun. 17, 2021

(65) Prior Publication Data
US 2022/0253494 A1  Aug. 11, 2022

(30) Foreign Application Priority Data

Dec. 13, 2019  (JP) .............................. JP2019-240118

(51) Int. Cl.
*G06F 16/9535* (2019.01)
*G06F 16/951* (2019.01)
*G06F 16/9538* (2019.01)

(52) U.S. Cl.
CPC ........ *G06F 16/9535* (2019.01); *G06F 16/951* (2019.01); *G06F 16/9538* (2019.01)

(58) Field of Classification Search
CPC . G06F 16/951; G06F 16/9535; G06F 16/9538
See application file for complete search history.

(56) References Cited

U.S. PATENT DOCUMENTS 9,569,550 B1 * 2/2017 Chen .................... G06F 16/951
10,013,493 B1 * 7/2018 Gandhi ............... G06F 16/9535
(Continued)

FOREIGN PATENT DOCUMENTS

JP  2009-258923 A  11/2009
JP  2011-227572 A  11/2011
(Continued)

OTHER PUBLICATIONS

Yamuna Krishnamurthy et al. "Interactive Exploration for Domain Discovery on the Web", online Aug. 14, 2016, ACM KDD Workshop on Interactive Data Exploration and Analytics (IDEA) referred on Dec. 13, 2019, pp. 64-71. (discussed in the specification).
(Continued)

*Primary Examiner* — Kris E Mackes
(74) *Attorney, Agent, or Firm* — Locke Lord LLP

(57) ABSTRACT

The present invention provides a personal-use search engine and a web crawler equipped with a login function. The present invention can construct and provide a search system and a database searchable and manageable by a user including a researcher or the like, by the user using a personal-use web crawler. After login with one-click SNS login function or login with e-mail, the user adds, to a database, sites crawled by a web crawler on a server accessible from a web browser. Accordingly, the user can obtain a satisfying search result from among data that is widely collected regarding a specific topic and can discover new valuable information in the data.

3 Claims, 3 Drawing Sheets

(56) References Cited

U.S. PATENT DOCUMENTS

| | | | |
|---|---|---|---|
| 2002/0147880 A1* | 10/2002 | Wang Baldonado | G06F 16/951 |
| | | | 707/E17.108 |
| 2005/0060286 A1 | 3/2005 | Hansen et al. | |
| 2010/0138413 A1 | 6/2010 | Wu et al. | |
| 2018/0165364 A1 | 6/2018 | Mehta et al. | |

FOREIGN PATENT DOCUMENTS

| | | |
|---|---|---|
| JP | 2013-515977 A | 5/2013 |
| KR | 2004-0005755 A | 1/2004 |

OTHER PUBLICATIONS

Michael Chau et al., "Personalized Spiders for Web Search and Analysis", Proceedings of The 1st ACM/IEEE-CS Joint Conference on Digital Libraries, ACM, Roanoke, Virginia, United States, Jan. 1, 2001, pp. 79-87. (cited in the Nov. 7, 2022 Search report issued for EP20900488.6).

Anonymous: "Web crawler—Wikipedia", Feb. 14, 2019, XP055975634, Retrieved from the Internet: URL; <https://web.archive.org/web/2019021402> 1641/>https://en.wikipedia.org/wiki/Web_cra>, pp. 1-16. (cited in the Nov. 7, 2022 Search Report issued for EP20900488.6).

Prashant Dahiwale et al., "Design of improved focused web crawler by analyzing semantic nature of URL and anchor text", 2014 9th International Conference On Industrial and Information Systems (ICIIS), IEEE, Dec. 15, 2014, pp. 1-6. (cited in the Nov. 7, 2022 Search Report issued for EP20900488.6).

Gautam Pant et al., "Search Engine-Crawler Symbiosis: Adapting to Community Interests", Research and Advanced Technology For Digital Libraries; [Lecture Notes In Computer Science; LNCS], Springer-Verlag, Berlin/Heidelberg, Feb. 25, 2004, pp. 221-232. (cited in the Nov. 7, 2022 Search Report issued for EP20900488.6).

Michael Chau et al., "SpidersRUs: Creating specialized search engines in Multiple languages", Decision Support Systems, vol. 45, No. 3, Jun. 1, 2008, pp. 621-640. (cited in the Nov. 7, 2022 Search Report issued for EP20900488.6).

Supplementary European Search Report dated Nov. 7, 2022, issued for European Patent Application No. 20900488.6.

* cited by examiner

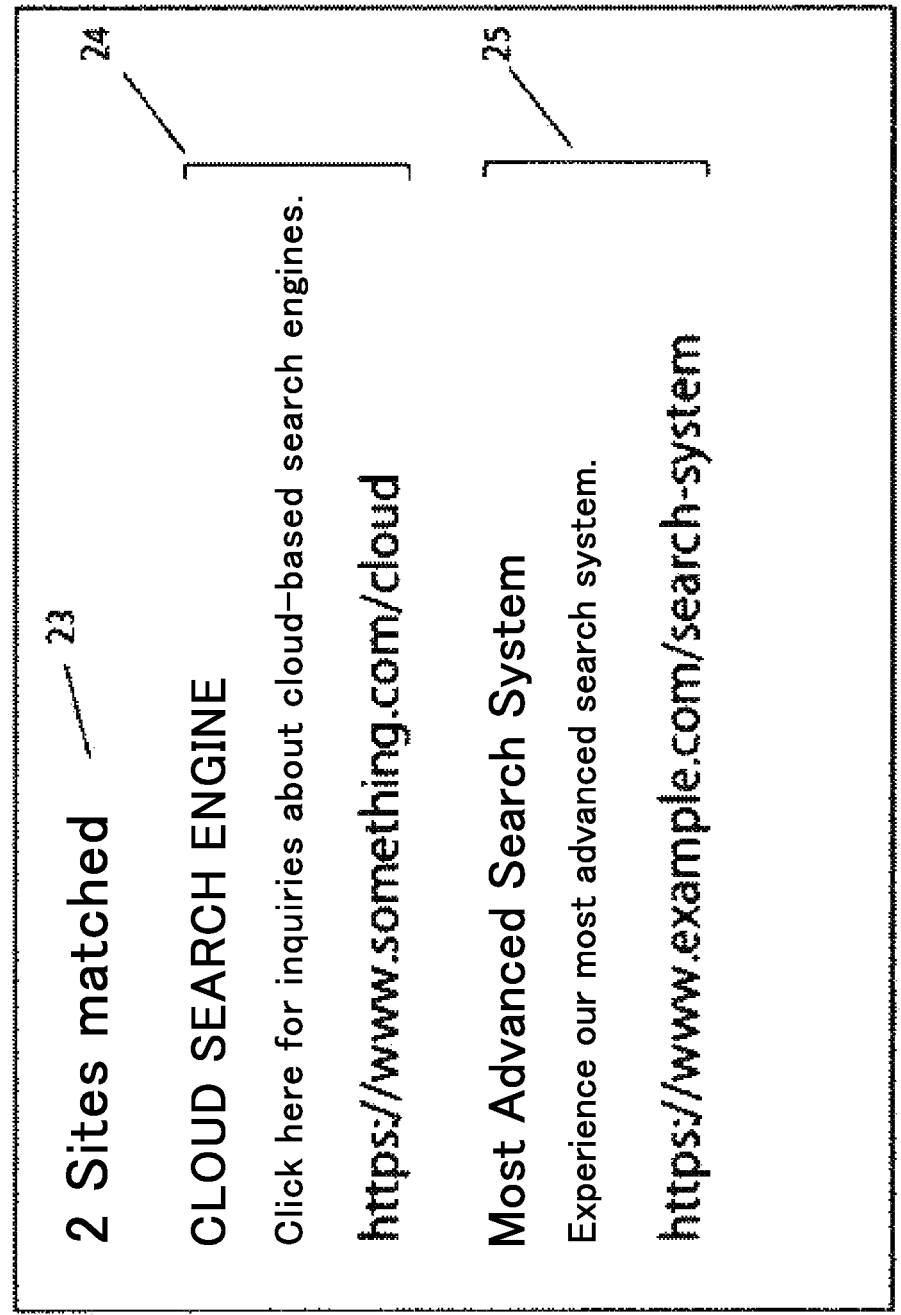

SEARCH DEVICE, SEARCH APPLICATION, AND SEARCH METHOD

TECHNICAL FIELD

The present invention provides a function for a user to index a website that is not included in the results of a web search engine by himself/herself using a web crawler. There is a function that allows the user to log in to the present invention in one step with a login function. The present invention relates to a personal search engine with a login function and a web crawler.

BACKGROUND ART

Conventionally, in a case where searching for information on the web, general users have searched only the websites registered on the search site operated by the search engine operating company.

The general users could not decide which site to be indexed by themselves, and searched for the site registered by the algorithm or the standard of the search engine operating company. The users such as researchers who wanted more information found the lack of the search results.

CITATION LIST

Non-Patent Document

Non-patent document 1: Yamuna Krishnamurthy, Kien Pham, Aecio Santos, Juliana Freire, "Interactive Exploration for Domain Discovery on the Web", [online] Aug. 14, 2016, ACM KDD Workshop on Interactive Data Exploration and Analytics (IDEA) [referred on Dec. 13, 2019], INTERNET (URL:http://poloclub.gatech.edu/idea2016/papers/p64-krishnamurthy.pdf)

SUMMARY OF THE INVENTION

Problems to be Solved by the Invention

More specifically, conventional search engines in general have the fundamental drawback that the users including the researchers cannot create a database of the information that the users want to search for. In addition, according to the survey as of 2014, even the search engine company with the largest market share in the world is said to cover only 4% of all sites on the Internet in its database. The traditional search engines have not been able to search for the information on other 96% of buried sites. Therefore, the search results are insufficient for users such as researchers. Further in addition, users using the common web search engines cannot use web crawlers to increase the search results of the search engine, even if the users try to increase the information on the website on a particular topic by themselves. In the present invention, the web is crawled according to the needs of the user. Therefore, the problem that the information is monopolized by some search engine operating sites or the problem that only biased sites are displayed is solved. The less biased sites that the users, including researchers, will want are indexed.

Means for Solving the Problems

The present invention builds a personal search engine on a page protected by a one-click SNS login function or an E-mail and password login function. Once the word which the user wants to increase is queried by an external search engine, the returned search result launches the web crawler. The web crawler can be started and stopped with a button on the web browser. Another way to increase the index data of the website may be to start the web crawler from the start URL.

The websites collected by the web crawler are added to the database with a single click. There is a way to search for websites collected from the same page as the web crawler. The present invention is the personal search engine and the web crawler with a login function having the above-described configuration.

The Effect of the Invention

The present invention makes it possible to acquire information that could not be acquired by the general web search engine. Researchers and users who need a wealth of information can freely increase and organize the information they are looking for.

According to our survey, general web search engines cover only 4% of all Internet sites. What this means is that, according to the present invention, even if an individual crawls, a rare or valuable site that is not listed in the web search engine can be found.

BRIEF DESCRIPTION OF THE DRAWINGS

FIG. 3 is a plan view showing an example of the search results of the present invention.

EMBODIMENT FOR CARRYING OUT THE INVENTION

Figure 1:
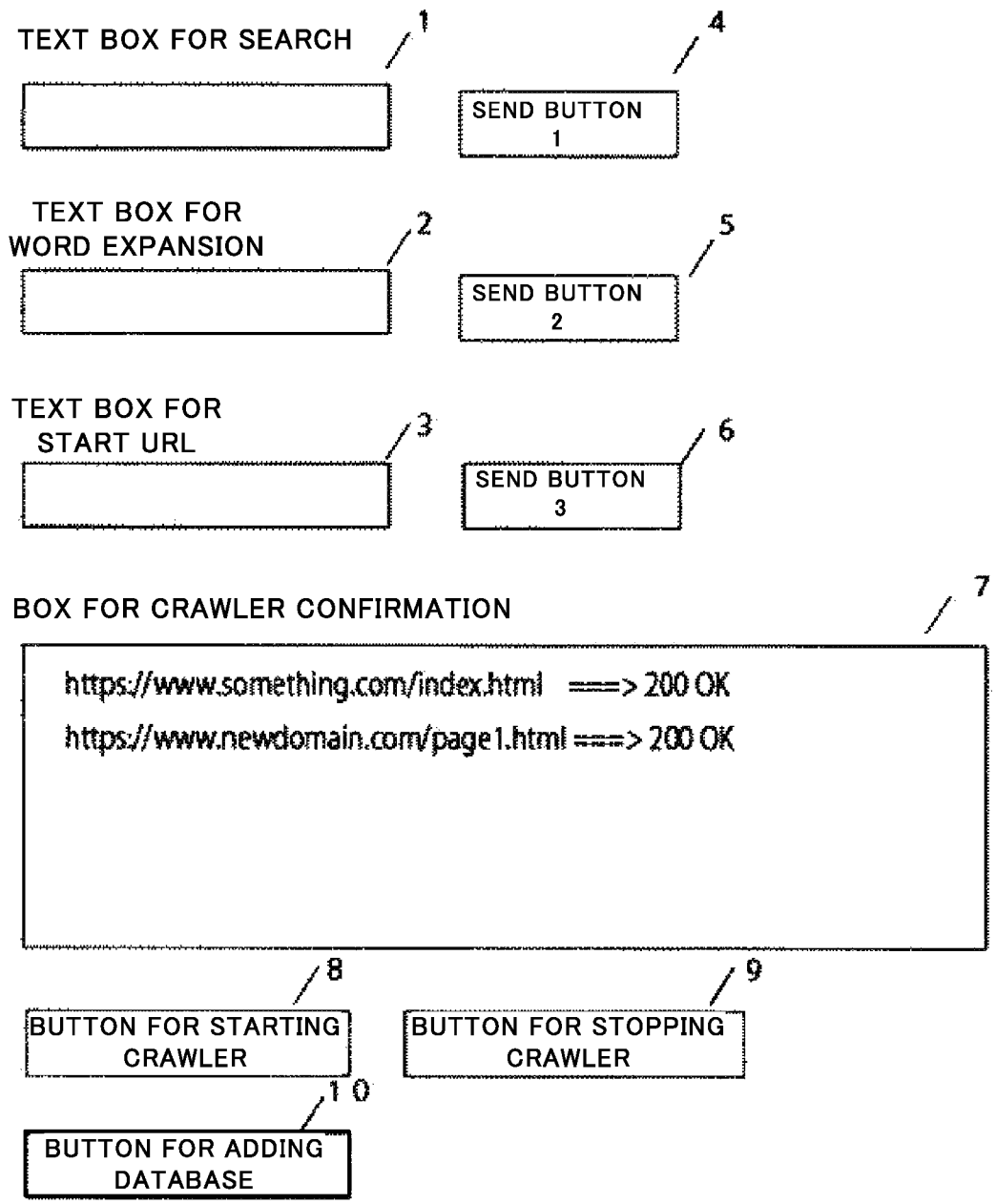
FIG. 1 is a plan figure showing the configuration of the operation screen of the present invention.
Figure 2:
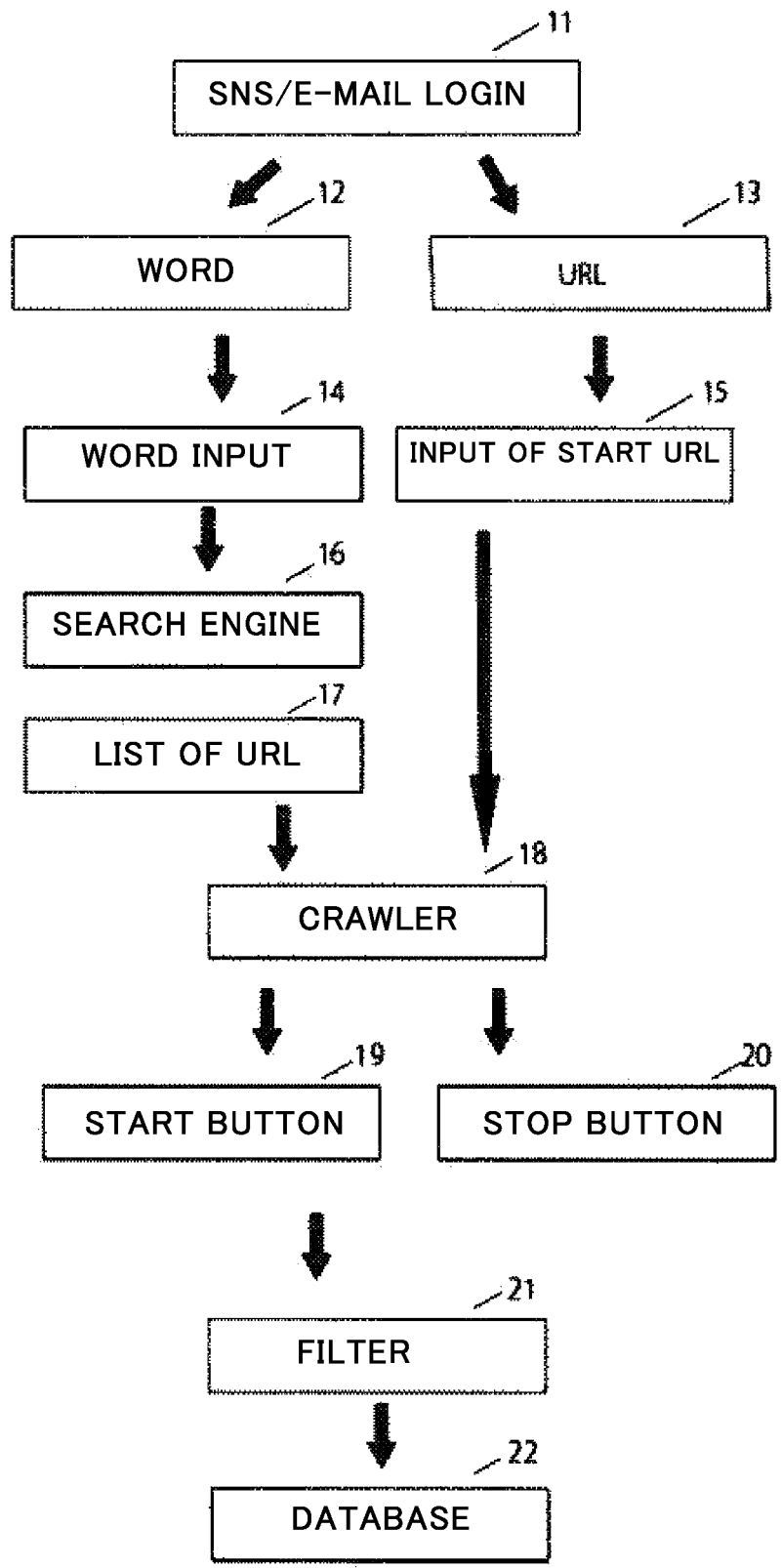
FIG. 2 is a diagram showing a flow of processing of the present invention.

Hereinafter, an embodiment for carrying out the present invention will be described. The contents of the above-described [MEANS FOR SOLVING THE PROBLEMS] will be described in more detail.

The present invention has the following structure.

When using the present invention, the clicking the one-click SNS (social networking service) login function button on an mobile information terminal including a personal computer or a smartphone and equipped with a web browser is performed. In a case where the user does not have an SNS account, the login function is performed after registering with the registration function using e-mail and password.

After the login is completed, the URL will be redirected to the logged-in page.

On the page after login, the user enters the word (topic), that he/she wants to increase using the present invention, into the text box.

After the user's entering in the text box for word expansion and pressing the button, the word (topic) that the user wants to increase is automatically asked to the external search engine once.

The list of the search result URLs is returned from an external search engine. The list itself, and the websites indicated by the URLs on this list, are not displayed. The web crawler is activated by pressing the button for starting the crawl using the list of URLs of the search results. The web crawler extracts and collects the titles, the keywords, the descriptions, the summaries, and more of the web site. Web crawlers can also start crawling from the URL which the user wants to start.

The web crawler can be started and stopped from the web browser by pressing the button at any time. By pressing the Enter Database button, the website data collected by the web crawler is added. From the same page, the users can search for the websites collected by the web crawler. The data crawled using the password for the SNS login function or the login function using E-mail is protected, so the data will not be disclosed to third parties.

When adding crawled data to the database, harmful sites are filtered by a text filter using regular expressions, and then indexed into the database.

DESCRIPTION OF REFERENCE NUMERALS

1 TEXT BOX FOR SEARCH
2 TEXT BOX FOR WORD EXPANSION
3 TEXT BOX FOR START URL
4 SEND BUTTON TO START SEARCHING
5 SEND BUTTON FOR WORD EXPANSION
6 SEND BUTTON FOR START URL
7 BOX FOR CRAWLER STATUS CONFIRMATION
8 BUTTON FOR STARTING CRAWLER
9 BUTTON FOR STOPPING CRAWLER
10 BUTTON FOR ADDING DATABASE
11 SNS/E-mail LOGIN BUTTON
12 Selecting a word
13 Selecting the URL
14 Entering a word
15 Entering the start URL
16 Inquiring the entered word to the search engine
17 The list of URLs is returned from the search engine.
18 The crawler is set to start from the list of URLs returned by the search engine, or to start from the start URL.
19 Clicking or tapping the start button starts the crawler.
20 Clicking or tapping the stop button stops the crawler.
21 Harmful sites are excluded by the filter.
22 The crawled site is registered in the database.
23 Number of the cases that matched the search query
24 Example 1 of the site that matches the search query
25 Example 2 of the site that matches the search query

The invention claimed is:

1. A search device comprising:
a means configured to make inquiries to a third party or own search engine by a query containing the specified word or multiple words after logging in using the login function;
a means configured to temporarily store the list of URLs replied to the inquiry while hiding the list and the website indicated by the URL included in the list;
a means configured to display operation buttons on one screen of the website, the operation buttons being operated by a user for starting and stopping the web crawler and indexing crawl results in the database;
a means configured to accept user instruction via the operation button for starting the web crawler in a case of starting crawling by a web crawler using the stored list of URLs;
a means configured to, when instructed by the user, crawl by obtaining a list of URLs to be crawled by the web crawler from the list of stored URLs and starting the web crawler;
a means configured to display the crawl results of each of the websites in a case where the crawling of the website is started by the operation of the operation button for starting the web crawler by the user and;
a means configured to store the crawl results in a personal web search database.

2. A search system that makes a computer to function as:
a means configured to make inquiries to a third party or own search engine by a query containing the specified word or multiple words after logging in using the login function;
a means configured to temporarily store the list of URLs replied to the inquiry while hiding the list and the website indicated by the URL included in the list;
a means configured to display operation buttons on one screen of the website, the operation buttons being operated by a user for starting and stopping the web crawler and indexing crawl results in the database;
a means configured to accept user instruction via the operation button for starting the web crawler in a case of starting crawling by a web crawler using the stored list of URLs;
a means configured to, when instructed by the user, crawl by obtaining a list of URLs to be crawled by the web crawler from the list of stored URLs and starting the web crawler;
a means configured to display the crawl results of each of the websites in a case where the crawling of the website is started by the operation of the operation button for starting the web crawler by the user and;
a means configured to store the crawl results in a personal web search database.

3. A search method comprising:
a step of making inquiries to a third party or own search engine by a query containing the specified word or multiple words after logging in using the login function;
a step of temporarily storing the list of URLs replied to the inquiry while hiding the list and the website indicated by the URL included in the list;
a step of displaying operation buttons on one screen of the website, the operation buttons being operated by a user for starting and stopping the web crawler and indexing crawl results in the database;
a step of accepting user instruction via the operation button for starting the web crawler in a case of starting crawling by a web crawler using the stored list of URLs;
a step of crawling, when instructed by the user, by obtaining a list of URLs to be crawled by the web crawler from the list of stored URLs and starting the web crawler;
a step of displaying the crawl results of each of the websites in a case where the crawling of the website is started by the operation of the operation button for starting the web crawler by the user and;
a step of storing the crawl results in a personal web search database.

* * * * *